United States Patent
Torabi

(10) Patent No.: US 6,754,482 B1
(45) Date of Patent: Jun. 22, 2004

(54) FLEXIBLE ACCESS AUTHORIZATION FEATURE TO ENABLE MOBILE USERS TO ACCESS SERVICES IN 3G WIRELESS NETWORKS

(75) Inventor: Mohammad Torabi, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/496,558

(22) Filed: Feb. 2, 2000

(51) Int. Cl.[7] .......................... H04M 1/66; H04M 1/68; H04M 3/16

(52) U.S. Cl. ................. 455/410; 455/414.1; 455/432.3; 455/435.1; 455/456.3; 455/433

(58) Field of Search ............................... 455/406, 410, 455/414.1, 414.3, 432.3, 433, 435.1, 456.3

(56) References Cited

U.S. PATENT DOCUMENTS

| | | | |
|---|---|---|---|
| 6,345,184 B1 * | 2/2002 | van der Salm et al. ... | 455/432.2 |
| 6,453,162 B1 * | 9/2002 | Gentry ........................ | 455/433 |

FOREIGN PATENT DOCUMENTS

| | | | | |
|---|---|---|---|---|
| WO | WO 98/23099 A2 | 5/1998 | | |
| WO | WO-9823099 * | 5/1998 | ............ | H04Q/7/00 |
| WO | WO 99/07106 A2 | 2/1999 | | |
| WO | WO 99/27722 A2 | 6/1999 | | |
| WO | WO 99/27723 A1 | 6/1999 | | |
| WO | WO-9927723 * | 6/1999 | ............ | H04Q/7/22 |

OTHER PUBLICATIONS

Hagen, L. et al: "Mobile Agent Based Service Subscription And Customization Using The UMTS Virtual Home Environment," Computer Networks, Elsevier Science Publishers B.V., Amsterdam, NL. vol. 31, No. 19, Aug. 31, 1999, pp. 2063–2078.

* cited by examiner

*Primary Examiner*—William Trost
*Assistant Examiner*—Stephen D'Agosta

(57) ABSTRACT

The flexible access authorization feature for wireless telecommunication systems enables network operators and/or service providers to dynamically authorize a user to receive services for which the subscriber has not previously subscribed or which are not supported in the user's home network. This is accomplished by enabling a user to expand and contract their portfolio of available communication services on an as needed basis to enable wireless users to use their user mobile terminals and obtain the services which they need, regardless of the user's location in the wireless communication network and regardless of the present set of services for which the user is authorized. The flexible access authorization feature is accomplished by real time interaction among the relevant functional entities of the wireless telecommunications system to obtain new or additional user information to execute the flexible access authorization logic to decide on access authorization to a selected service. The flexible access authorization logic can reside in any of a number of network entities and can examine a number of conditions to determine access authorization for a user with respect to a selected service, including: time-dependency, location-dependency, account billing limitations, and other factors.

7 Claims, 2 Drawing Sheets

FLEXIBLE ACCESS AUTHORIZATION FEATURE TO ENABLE MOBILE USERS TO ACCESS SERVICES IN 3G WIRELESS NETWORKS

FIELD OF THE INVENTION

This invention relates to wireless telecommunications systems and, in particular, to the provision of a feature that enables network operators and/or service providers to dynamically authorize a user to receive services for which the subscriber has not previously subscribed or which are not supported in the user's home network.

Problem

It is a problem in the field of wireless telecommunications systems for network operators and/or service providers to offer a subscriber wireless services that either are not supported in their home network or to enable a user to access a particular service offering, on a per call basis or for a selected period of time, for which the subscriber has not previously subscribed. The service may not be available in the subscriber's home network because it may not be economical for the home network operator to provide the requested service, or the home network may not be technically capable of providing the requested service on its own. In these instances, the roaming user is denied the service since the home network operator does not support the service. Alternatively, the user has not contracted to receive a requested wireless service, but may be willing to pay for use of this service on a per call basis or for a predetermined period of time, whether in the user home network or while roaming in a visited network. In both of these instances, the user is denied service in existing wireless telecommunications systems.

In existing $1^{st}$ and $2^{nd}$ Generation wireless networks, the user access authorization feature is processed every time a wireless mobile user station registers and a service request originates from this wireless mobile user station. The service request is processed using either a switch-based or an intelligent network-based approach. The switch-based approach entails a user originating a request to the Mobile Switching Center of the serving network to register and place a request for service. The service request is forwarded by the Mobile Switching Center of the serving network to the user's Home Location Register if the user is located in their home network, or to the Visited Location Register of the serving network if the user is roaming. In the latter case, the Visited Location Register of the serving network requests subscriber profile information from the user's Home Location Register to determine whether the user is authorized to receive the requested service. The user's request for service is either authorized or denied based upon data stored in the subscriber's Home Location Register if any of a number of conditions are met. It is denied if the requested service is not supported by the subscriber's home network, the subscriber has failed to subscribe to the requested service, a resource necessary to provide the service is unavailable, the user identification is invalid, and the like. In the Wireless Intelligent Network approach to processing a service request, the service request is detected at a Wireless Intelligent Network trigger point in the Mobile Switching Center of the serving network. The Wireless Intelligent Network processes the service request in a manner analogous to that described above for the switch-based approach.

Therefore, existing wireless telecommunications systems are static in their response to user service requests and are incapable of dynamically adapting to the ever-changing needs of the wireless users. The subscriber service profile is managed statically in a manual manner, and in real time, it cannot be revised to address user needs on a per call basis or on a temporary basis. An existing feature in ANSI-41 2G provides capability for "Over The Air Service Provisioning" (OTASP). However, once the service is provisioned/subscribed, the authorization procedure becomes the same as the static procedure described above.

Solution

The above described problems are solved and a technical advance is achieved by the flexible access authorization feature for wireless telecommunication systems which enables network operators and/or service providers to dynamically authorize a user to receive services for which the user has not previously subscribed or which are not supported in the user's home network. This is accomplished by enabling a mobile user to obtain the services which they need. This is done regardless of the user's location in the wireless communication network and regardless of the present set of subscribed services for which the user is authorized to use.

This flexible access authorization feature expands the marketability of various supplementary and customized wireless services and increases the rate of return on investment for the wireless telecommunication networks by making the services available on a per call rather than on a fixed subscription basis. This is accomplished by real time interaction among the relevant functional entities (UIMF, MCF, LMF, SCF) of the wireless telecommunications system to obtain new and/or additional subscriber information to execute the flexible access authorization program to decide on authorizing access to a selected service. The flexible access authorization logic can reside in any of a number of network entities, including: UIMF, LMF (enhanced VLR/HLR) or SCF. The interactions among these functional entities can examine a number of conditions to determine access authorization for a user with respect to a wide range of services, including: time-dependent, location-dependent, account billing dependent, and other factors.

The use of a supporting network for wireless telecommunication systems assists in the execution of the flexible access authorization feature to provide desired services to the mobile user terminal, directly through the interconnection of the visited network with the supporting network. The network inter-connection can be made possible by the use of a unique Network-to-Network Interface protocol that enables a supporting network operator to become a purveyor of third generation mobile telecommunications services to users who are presently served by wireless communications networks that are incapable of providing these services.

DETAILED DESCRIPTION OF THE DRAWINGS
Definitions

For the purpose of this description, the following definitions are provided for various terms that are used herein:

Wireless Communications Network is a wireless network comprised of base stations, base station control systems, and one or Mobile Switching Centers.

Wireless Communications System is a system of Wireless Communications Networks (e.g., Home Networks, Supporting Networks, and Visited Networks).

Figure 1:
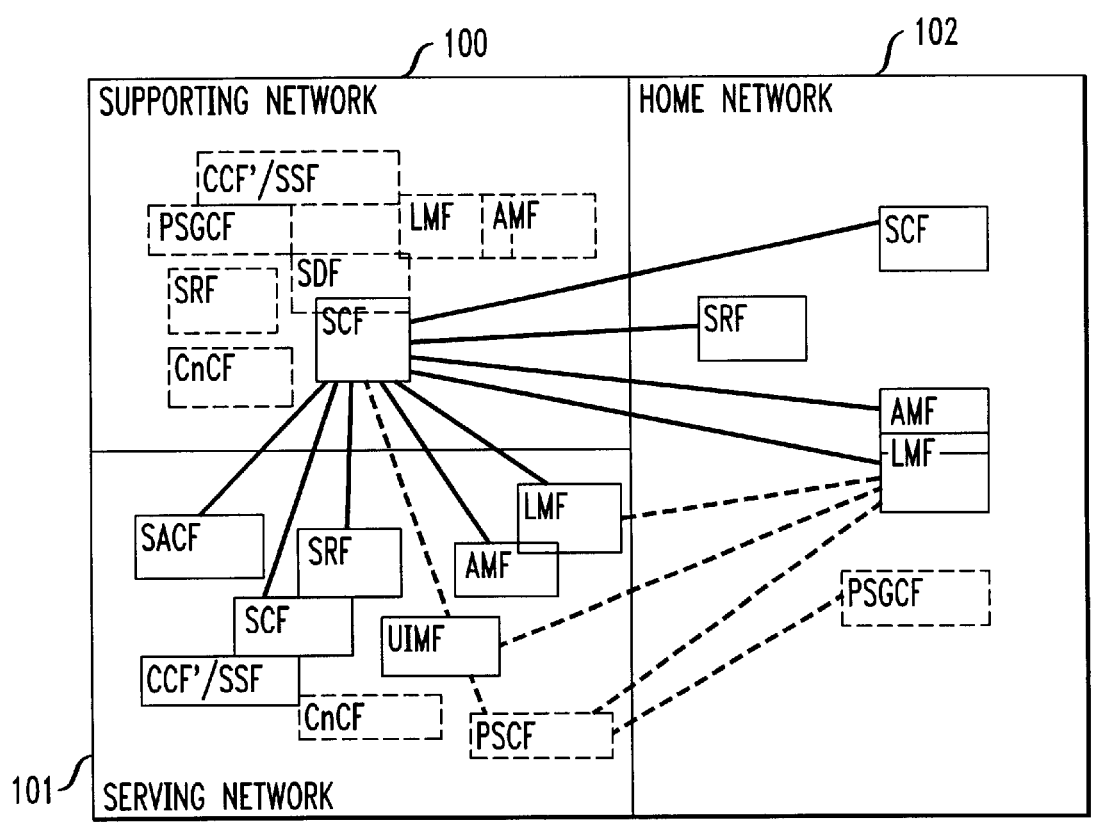
FIG. 1 illustrates in block diagram form the architecture of a supporting network which is inter-connected with other wireless communications networks for third generation telecommunication systems (e.g., IMT-2000). The home and visited networks are associated with the mobile user having service subscription in the "home network" and visiting a "serving/visited network."

Home Network 102 as shown in FIG. 1 is the wireless communications network which holds location and service profile information related to the subscriber.

Supporting Network 100 as shown in FIG. 1 is the communications network (fixed or wireless) which provides support for a variety of services including but not limited to service logic programs and service related data for supplementary services.

Visited (Serving) Network 101 as shown in FIG. 1 is the wireless communications network where a user is presently being served.

Supporting Network Inter-Connection

In the majority of $1^{st}$ and $2^{nd}$ Generation wireless networks, the notion of Service Provider and Network Operator are synonymous. However, due to increasingly expanding deregulated consumer market, it is anticipated that these two entities of the telecommunication industry are destined to evolve into independent entities. FIG. 1 is the block diagram of the architecture of a supporting network 100 as inter-connected with existing third generation telecommunication systems, consisting in this example of a serving/visited network 101 and a home network 102. The Functional Entities (FE) used in FIG. 1 are the existing components of a typical wireless communications network as described below. In this figure, the major Functional Entities that may be involved in inter-network communications are shown in solid rectangles (e.g., SCF, LMF, AMF, and SACF).

Functional Entities of Wireless Communications Systems

There are a plurality of Functional Entities implemented in wireless communication systems, and the following are noted in the description (the terminology defining well known entities in accordance with ITU-T standards), and they are exemplary of the types of entities used for deployment of the flexible access authorization scheme:

| | |
|---|---|
| AMF: | Authentication Management Function |
| CCAF: | Call Control Access Function |
| CCF: | Call Control Function |
| CnCF: | Connection Control Function |
| LMF: | Location Management Function |
| MCF: | Mobile Control Function |
| PSCF: | Packet Service Control Function |
| PSGCF: | Packet Service Gateway Control Function |
| SACF: | Service Access Control Function |
| SCF: | Service Control Function |
| SDF: | Service Data Function |
| SRF: | Specialized Resource Function |
| SSF: | Service Switching Function |
| UIMF: | User Identification Module Function |

Figure 2:
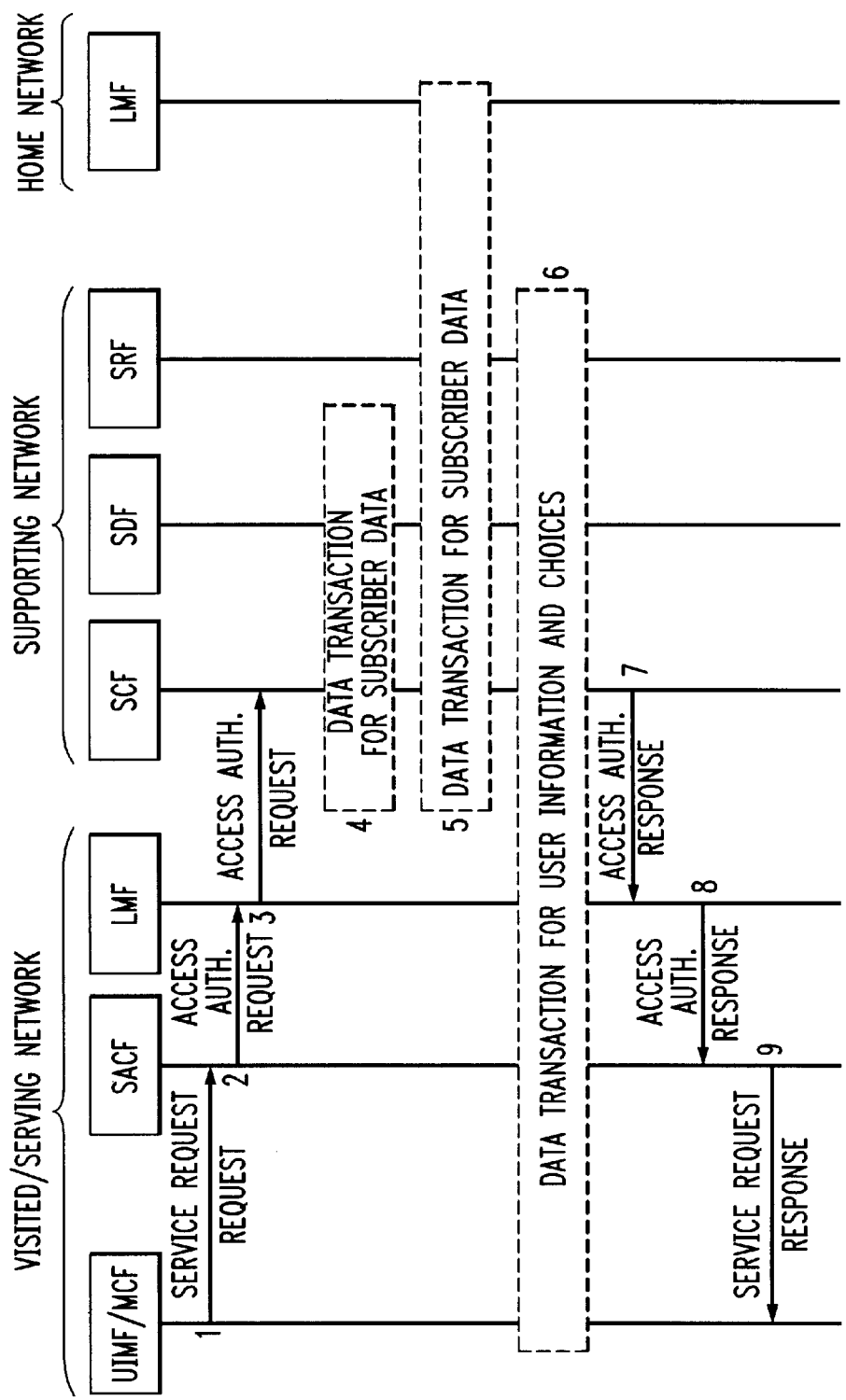
FIG. 2 illustrates the signal flow among the various wireless networks illustrated in FIG. 1 to serve a flexible access authorization request.

FIG. 2 illustrates the signal flow among the various wireless networks illustrated in FIG. 1 to serve a flexible access authorization request to dynamically authorize a user to receive services for which the subscriber has not previously subscribed or which are not supported in the user's home network. In response to a wireless user's call activity, the serving/visited network, or an agent employed by a service provider, provides the user with information regarding the availability of a wireless service that may be of interest to the user. The user can elect to request authorization to receive the identified service on a per call basis, or for a predetermined period of time. For example, the user may be traveling on a business trip and wishes to receive roaming Internet access for the duration of the business trip. Alternatively, the user may request data and voice transmission service on a single call to enable the user to interact with another user or a messaging system. In any case, once the user is presented with the option and signifies interest in electing to receive the selected service, the flexible access authorization function is initiated and executed as described below.

Signal Flow #1

The User Identification Module Function UIMF transmits a user's request for access to a designated service to the Service Access Control Function SACF via the base station in the Serving Network.

Signal Flow #2

The request for a service is transmitted from the Service Access Control Function SACF to the Location Management Function LMFv in the Serving Network to identify the home location of this user and obtain access authorization, based on the subscriber's service profile. As a part of the normal mobile user's registration procedure, the Location Management Function LMFv in the Serving Network has already obtained service profile information for the subscriber, including knowledge of the user's home and supporting networks.

Signal Flow #3

The request for a service is transmitted from the Location Management Function LMFv in the Serving Network to the Service Control Function SCFsn in the Supporting Network to check on the flexible access authorization condition and possible execution of the flexible access authorization logic. If the user requires flexible access authorization for the requested service, the flexible access authorization function is executed using data stored in the subscriber's service profile in the Home Location Register and additional information received optionally from the user (such as credit card number). The subscriber's service profile can include data indicative of various conditions under which the user is authorized to receive a selected service. Thus, the user of a subscription may be conditionally authorized to receive a selected service within a certain service area, on a preauthorized basis. Therefore, when the user originates a request for this service while located in this service area, the flexible access authorization function determines from the subscriber's service profile that this service is authorized. Similarly, time-based conditional service authorizations may be used to authorize users to receive a selected service for a predetermined time period, such as the dates on which they are traveling on business.

Signal Flow #4

Subscriber' data is transmitted from the Service Data Function in the Supporting Network (SDFsn) to the Service Control Function in the Supporting Network (SCFsn) to obtain data on the flexible access authorization conditions. As an intra-network flow, this flow does not impact the inter-network signaling requirements and, as such, it may be deleted from the list of Network to Network Interface (NNI) protocol operations.

Signal Flow #5

Data is transmitted from the Location Management Function in the Home Network (LMFh) to the Service Control Function in the Supporting Network (SCFsn) to obtain information on user location. This is a conditional flow based on the flexible access authorization conditions.

Signal Flow #6

Instruction is transmitted from the Service Control Function in the Supporting Network (SCFsn) to the Call Control Access Function CCAF/MCF, a common procedure. This flow is to interact with the user via the Call Control Function in the Serving/Visited Network (CCF'/SSFv) and the Specialized Resource Function in the Supporting Network (SRFsn). This is a conditional flow based on the flexible access authorization conditions.

Signal Flow #7

Response is transmitted from the Service Control Function in the Supporting Network (SCFsn) back to the Location Management Function in the Serving/Visited Network (LMFv) responding to the flexible access authorization request.

Signal Flow #8

Response is transmitted from the Location Management Function in the Serving/Visited Network (LMFv) back to the Service Access Control Function in the Serving/Visited Network (SACFv) responding to the flexible access authorization request.

Signal Flow #9

Response is transmitted from the Service Access Control Function in the Serving/Visited Network (SACFv) back to the User Identification Module Function (UIMF) to authorize or deny access in response to the flexible access authorization request.

In this example, the supporting network may play an integral role in interconnecting the visited network and the home network as described above. Alternatively, the entire process described above may be executed within the users' home network if the users are simply requesting access to a service for which they are not presently authorized to receive. In any case, the flexible access authorization function is executed to provide dynamic and real-time changes to the subscriber's profile to authorize access to a selected service either on a per call or time period basis.

Summary

The flexible access authorization feature in wireless telecommunication systems enables network operators and/or service providers to dynamically authorize a user to receive services that neither the subscriber has previously subscribed to nor the user's home network supports. This is accomplished by enabling a subscriber to expand and contract their portfolio of available wireless services on an as needed basis. It is to enable wireless users to obtain the services which they need, regardless of the user's location in the wireless communication network and regardless of the present set of services for which the user is authorized.

What is claimed:

1. A flexible access authorization function for providing a selected communication service to a user whose mobile user terminal is operational in a wireless telecommunication network, where the user's home network cannot provide said communication service requested by said user or said subscriber is not subscribed to the said communication service requested by said user, comprising:

means, responsive to a user at said mobile terminal requesting a communication service where the user's home network cannot provide said communication service requested by said user or said subscriber is not subscribed to the said communication service requested by said user, for transmitting a message from said wireless telecommunication network, designating said requested service, to a home network of said user;

means, in said home network of said user responsive to receipt of said message, for retrieving a service profile for said subscriber from a home location register of said user; and means for determining authorization to execute said communication service, based on said service profile for said user and said communication service, comprising:
means for receiving said service profile for said user,
means for executing flexible access authorization logic to determine said user's authorization to receive said communication service based on said service profile for said user,
means for retrieving conditional authorization data from said service profile for said subscriber, and
means for comparing said conditional authorization data for said user with present conditions, including: temporal, location, financial to determine said user's authorization to receive said communication service based on said service profile for said subscriber.

2. The flexible access authorization function of claim 1 wherein said telecommunication network provides said requested service to user terminals comprising:

at least one of: fixed, mobile, and cordless terminals.

3. The flexible access authorization function of claim 1 further comprising:

means, responsive to said means for determining, for authorizing said user to receive said requested service on a one of: a per call basis, a predetermined time period basis, a predetermined location basis.

4. A method of providing flexible access authorization to a selected communication service to a user whose mobile terminal is operational in a wireless telecommunication network, where the user's home network cannot provide said communication service requested by said user or said subscriber is not subscribed to the said communication service requested by said user, comprising the steps of:

transmitting, in response to a user at said mobile terminal requesting a communication service where the user's home network cannot provide said communication service requested by said user or said subscriber is not subscribed to the said communication service requested by said user, a message from said wireless telecommunication network, designating said requested service, to a home network of said user;

retrieving, in said home network of said user in response to receipt of said message, an service profile for said subscriber from a home location register of said user; and determining authorization to execute said communication service, based on said service profile for said subscriber and said communication service, comprising:
receiving said service profile for said user,
executing flexible access authorization logic to determine said user's authorization to receive said communication service based on said service profile for said user,
retrieving conditional authorization data from said service profile for said subscriber, and
comparing said conditional authorization data for said user with present conditions, including: temporal, location, financial to determine said user's authorization to receive said communication service based on said service profile for said subscriber.

5. The method of providing flexible access authorization to a selected communication service of claim 4 further comprising the step of:

providing said requested service to user terminals comprising at least one of: fixed, mobile, and cordless terminals.

6. The method of providing flexible access authorization to a selected set of communications services of claim 5 further comprising of steps of:

providing set said requested services to users whose fixed terminal is operational in fixed telecommunication systems comprising of fixed networks only.

7. The method of providing flexible access authorization to a selected communication service of claim 4 further comprising the step of:

authorizing, in response to said step of determining, said user to receive said requested service on a one of: a per call basis, a predetermined time period basis, a predetermined location basis.

* * * * *